United States Patent
Kawanishi et al.

(10) Patent No.: US 7,330,133 B2
(45) Date of Patent: Feb. 12, 2008

(54) ENGINE CONDITION INDICATING DEVICE FOR BOAT

(75) Inventors: Masaru Kawanishi, Hamamatsu (JP); Takashi Okuyama, Hamamatsu (JP)

(73) Assignee: Yamaha Marine Kabushiki Kaisha (JP)

( * ) Notice: Subject to any disclaimer, the term of this patent is extended or adjusted under 35 U.S.C. 154(b) by 16 days.

(21) Appl. No.: 10/967,949

(22) Filed: Oct. 19, 2004

(65) Prior Publication Data
US 2005/0122213 A1 Jun. 9, 2005

(30) Foreign Application Priority Data
Nov. 28, 2003 (JP) .............................. 2003-400616

(51) Int. Cl.
*G08B 23/00* (2006.01)
(52) U.S. Cl. ........................................ 340/984; 701/21
(58) Field of Classification Search ................ 340/984, 340/438, 439, 441, 449, 451, 461; 701/21
See application file for complete search history.

(56) References Cited

U.S. PATENT DOCUMENTS

| | | | | |
|---|---|---|---|---|
| 4,523,457 A | * | 6/1985 | Bayer et al. | 73/114 |
| 5,367,297 A | * | 11/1994 | Yokoyama | 340/984 |
| 5,374,917 A | * | 12/1994 | Hoffman et al. | 340/438 |
| 5,422,625 A | * | 6/1995 | Sakaemura | 340/461 |
| 5,941,922 A | * | 8/1999 | Price et al. | 701/51 |
| 2003/0067384 A1 | * | 4/2003 | Funayose et al. | 340/438 |

FOREIGN PATENT DOCUMENTS

| | | |
|---|---|---|
| DE | 33 09 802 A1 | 9/1984 |
| DE | 195 33 829 C1 | 9/1996 |
| EP | 0 810 121 A1 | 12/1997 |
| JP | 63-65480 | 3/1988 |
| JP | 63-83787 | 4/1988 |
| JP | 63-65481 | 9/1988 |
| JP | 6-27978 | 4/1994 |
| WO | WO 99/45399 A1 | 9/1999 |

OTHER PUBLICATIONS

European Search Report dated Mar. 4, 2005 for Application No. EP 04 025224.

* cited by examiner

*Primary Examiner*—Brent A. Swarthout
(74) *Attorney, Agent, or Firm*—Knobbe Martens Olson & Bear LLP

(57) ABSTRACT

An engine condition indicating device for a boat automatically adjusts the indication range of condition data values of different engines to the range of an indicating section to provide an appropriately positioned indication for each engine. The engine condition indicating device indicates a condition data value such as a detected engine oil pressure as an indication object at a predetermined position in an indication area of an indicating section. Indication information, which includes a condition value determined in association with the indication area as an indication object for the engine, is preset. The condition data value transmitted from the engine as an indication object is processed based on the indication information to cause the indication object to be displayed at a predetermined position in the indication area of the indicating section.

16 Claims, 5 Drawing Sheets

ENGINE CONDITION INDICATING DEVICE FOR BOAT

CROSS REFERENCE TO RELATED APPLICATIONS

This application is based on and claims priority to Japanese Patent Application No. 2003-400616, filed on Nov. 28, 2003, the entire content of which is hereby expressly incorporated herein by reference.

BACKGROUND OF THE INVENTION

1. Field of the Invention

The present invention relates to an engine condition indicating device for indicating conditions of an engine of a boat, the conditions including, for example, engine oil pressure, engine cooling water temperature, and engine speed.

2. Description of the Related Art

Some conventional boats equipped with an outboard motor include an indicator that indicates (e.g., visually displays) analog indications of condition data values that represent engine conditions of the outboard motor, such as, for example, engine oil pressure, engine cooling water temperature, and engine rotational speed.

The indicator has an indicating section that includes an area which shows a warning upper limit value, a warning lower limit value, and an appropriate range for a condition data value.

SUMMARY OF THE INVENTION

In the above-described conventional outboard motors, the upper and lower limit values of an appropriate range (normal range) and the lower limit value of an abnormal range generally differ depending on the engine. For example, an engine of a first type (e.g., a first model) may have a normal range of 45° C. to 65° C. and may have an abnormal range of 85° C. and more for engine cooling water temperature. An engine of a second type may have a normal range of 55° C. to 75° C. and may have an abnormal range of 95° C. and more for engine cooling water temperature. Thus, if an engine of one type is replaced with an engine of a different type without replacing the indicator (e.g., the same indicator is used before and after the engine replacement), inappropriate indications occasionally occur because of the differences between the engines. For example, the indicator may provide an indication in the abnormal range when the indication is not actually abnormal for the replacement engine, or the indicator may provide an indication in the normal range when the indication should actually be abnormal for the replacement engine. When a new outboard motor is installed, the new motor needs to be associated with the indicator; however, even if a number of types of indicators are provided, the indicator may not be associated with the outboard motor with accuracy, and a problem of inappropriate indication may arise.

In view of the foregoing, an embodiment in accordance with an aspect of the present invention is an engine condition indicating device for a boat that is capable of automatically adjusting the indication range of condition data values of different engines to the range of an indicating section to provide an appropriately positioned indication.

This embodiment of the engine condition indicating device indicates a condition data value, such as a value representing oil pressure detected at an engine, as an indication object at a predetermined position in an indication area of an indicating section of the indicating device. The condition data value is transmitted from the engine as an indication object. In accordance with this embodiment, preset indication information includes a condition value of the engine as an indication object. The condition value is determined in association with the indication area. The condition data value from the engine is processed based on the indication information, and the indication object for the condition data value is displayed at the predetermined position in the indication area of the indicating section with respect to the indication object for the condition value.

Preferably, the engine condition indicating device for a boat includes a warning upper limit position, a warning lower limit position, a safe range upper limit position, and a safe range lower limit position, which are set in the indicating section of the indication area.

Preferably, the condition data value represents an engine operating parameter, such as, for example, engine oil pressure, engine cooling water temperature, or engine speed.

Preferably, the indication information is stored at the engine.

In accordance with other preferred embodiments of the engine condition indicating device, a plurality of sets of indication information corresponding to engines of a plurality of different models (e.g., types) are stored at the indicator. The engine model information is transferred to the indicator from a respective engine as the indication object. Based on the engine model information, a predetermined set of indication information is selected from the plurality of sets of indication information and is used to process the condition data value.

In accordance with the foregoing embodiments, preset indication information includes a condition value of the engine as an indication object. The condition value is determined in association with the indication area. The condition data value transmitted from the engine as an indication object is processed based on the indication information to be displayed at a predetermined position in the indication area of the indicating section. Therefore, even when the engine is replaced with a counterpart engine of a different model (e.g., type) with respect to the indicator, the indication range and other values that utilize indication information of the engine as an indication object are automatically set to provide appropriate indications for engines with different characteristics.

In particular embodiments, a warning upper limit position, a warning lower limit position, a safe range upper limit position and a safe range lower limit position are set in the indicating section of the indication area. Therefore, engine conditions can be recognized more accurately for different engines that are coupled to the indicator.

BRIEF DESCRIPTION OF THE DRAWINGS

The foregoing features and other features of embodiments in accordance with the present invention are described below in connection with the drawings in which.

DETAILED DESCRIPTION OF THE PREFERRED EMBODIMENT

Figure 1:
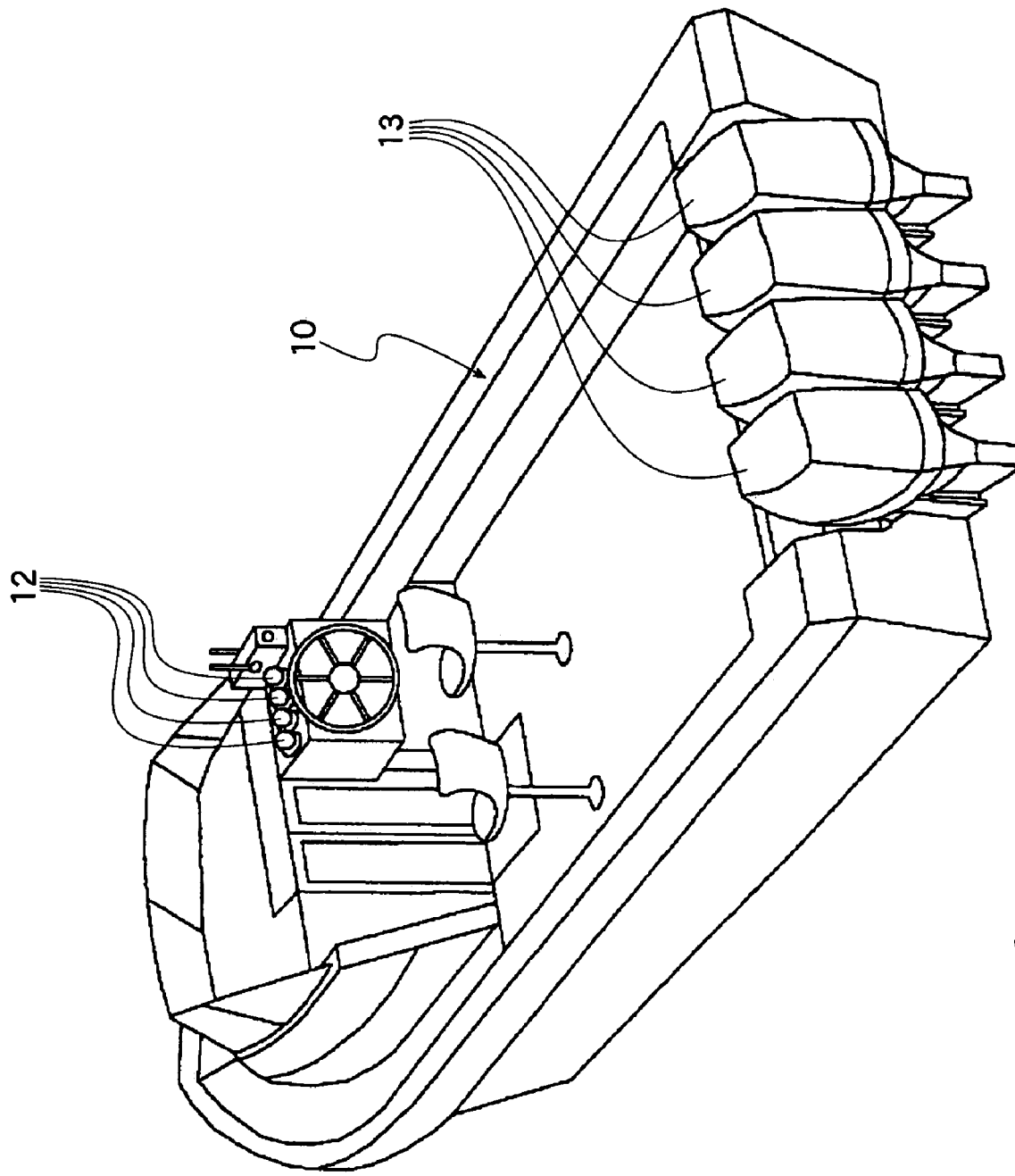
FIG. 1 illustrates a perspective view of a boat that advantageously incorporates embodiments in accordance with the present invention.

Embodiments in accordance with aspects of the present invention are described below in connection with the attached drawings in which the elements of the drawings are identified by reference numerals, with like numerals identifying like elements in each of the drawings.

Figure 2:
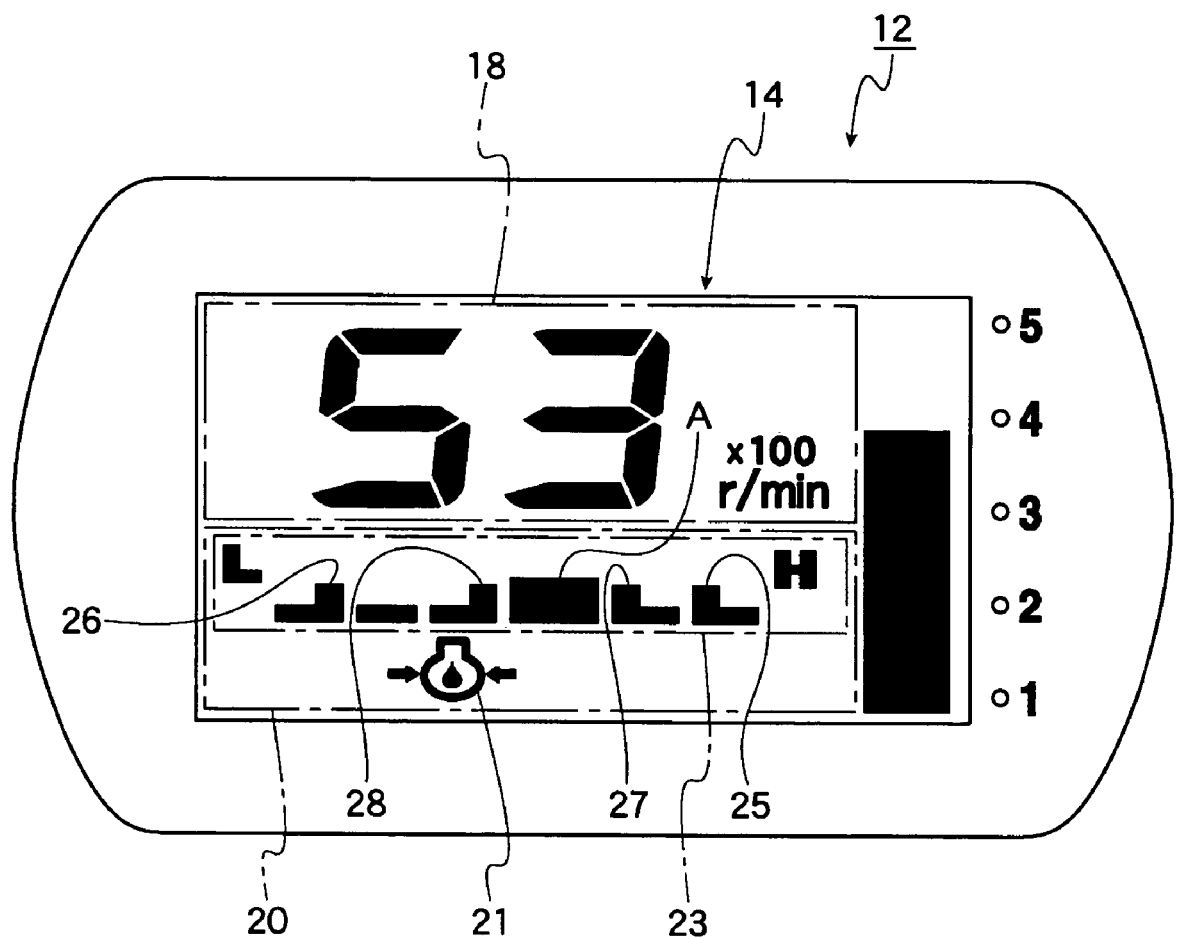
FIG. 2 illustrates a front view of a preferred embodiment of an indicator.
Figure 3:
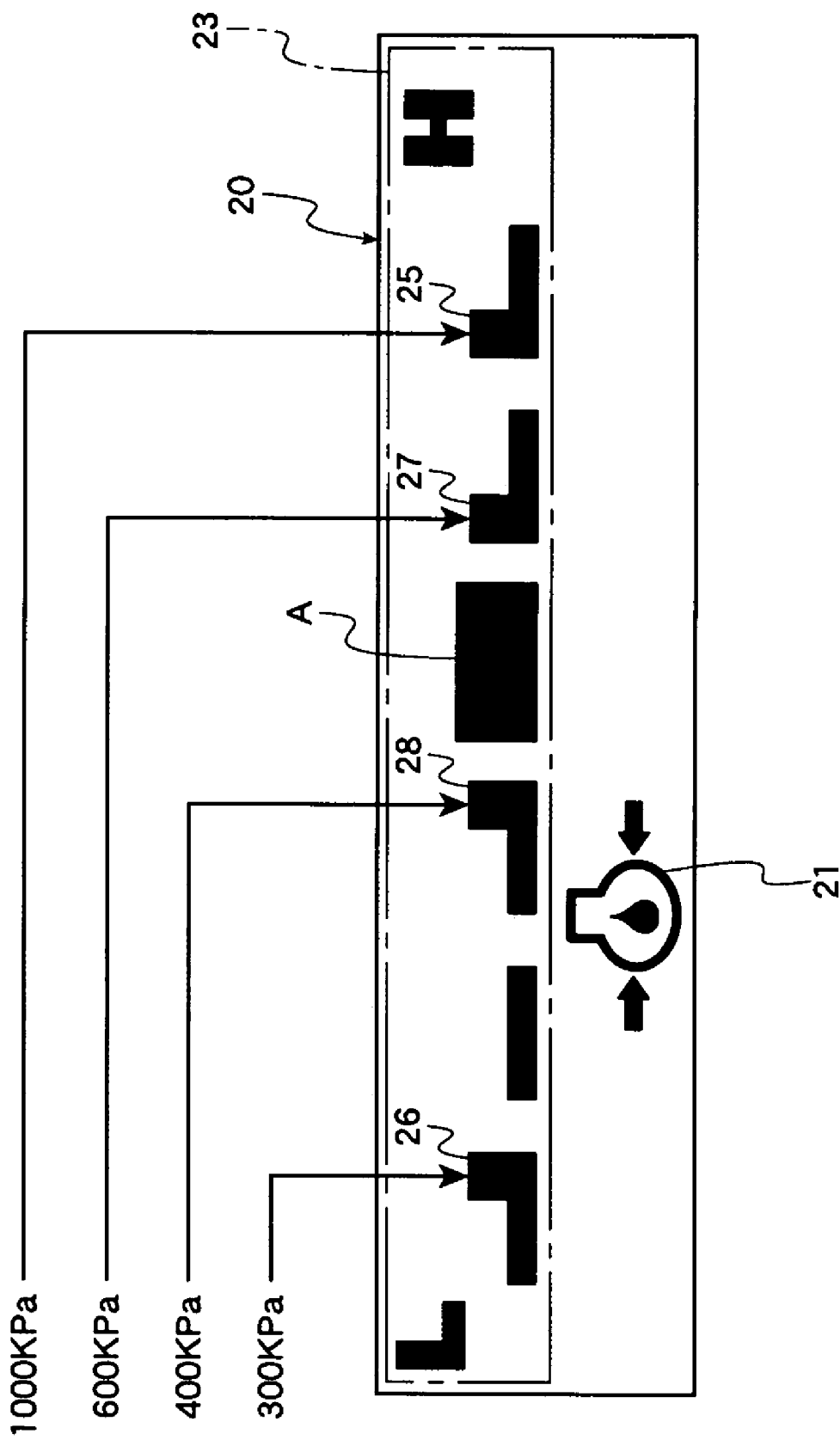
FIG. 3 illustrates an enlarged view of an engine condition indicating section of the indicator of FIG. 2.
Figure 4:
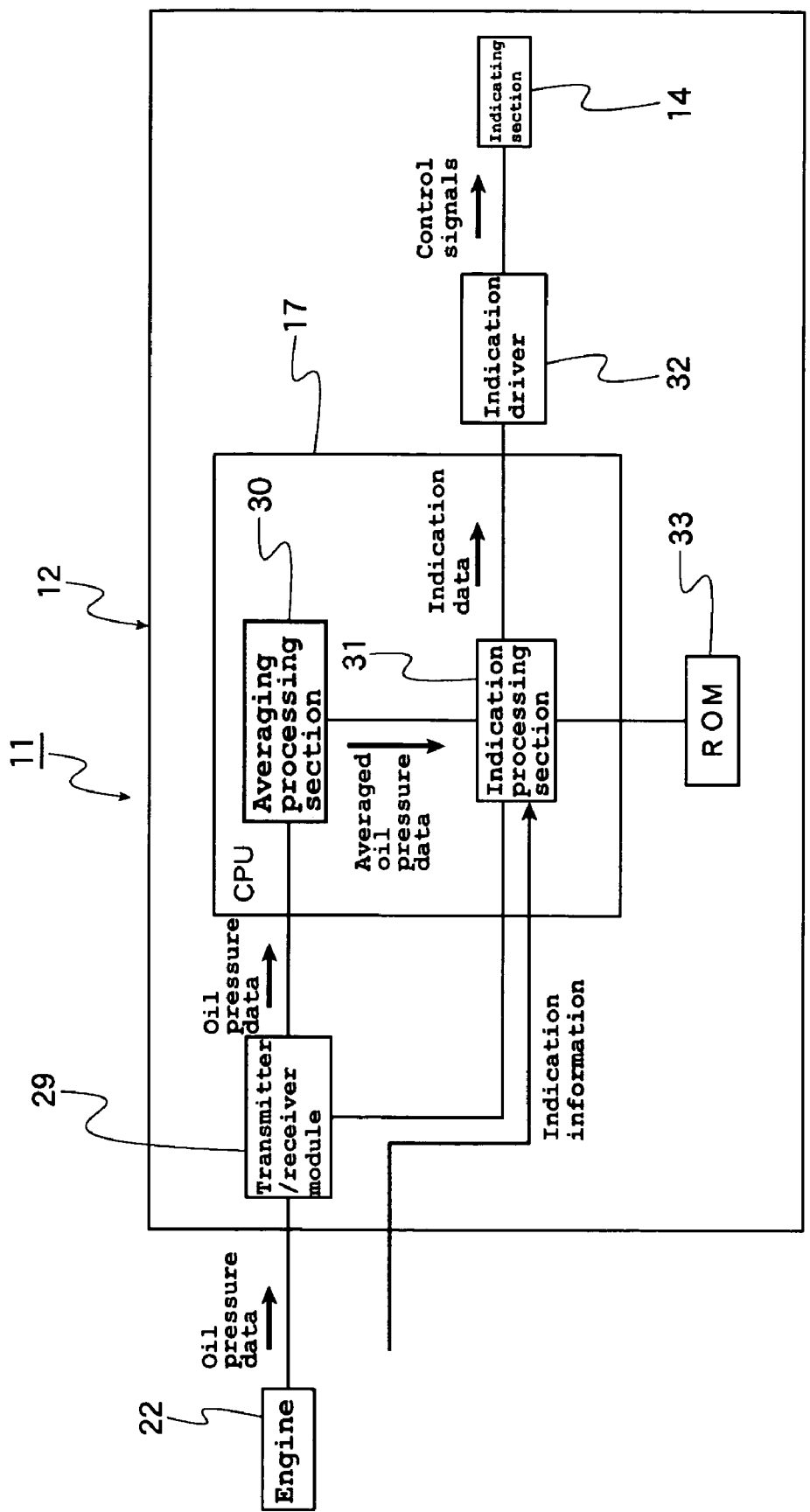
FIG. 4 illustrates a block diagram of a preferred embodiment of an engine condition indicating device for a boat.

FIGS. 1-4 illustrate an embodiment in accordance with an aspect of the present invention, which is incorporated into a hull 10 of a boat that includes multiple (e.g., four) outboard motors 13 positioned at the rear of the hull 10. In the illustrated example, four indicators 12 are provided at the front of an operator's seat on the hull 10. The multiple outboard motors 13 and the respective indicators 12 are connected via a LAN (Local Area Network), which is not shown in the figures but which is well-known to one skilled in the art. The indicators 12 indicate engine conditions of the respective outboard motors 13. For example, each indicator 12 includes an engine condition indicating device 11 (illustrated by a block diagram in FIG. 4) that indicates engine conditions of an engine 22 of a respective one of the outboard motors 13. For example, the oil pressure condition of the engine 22 is illustrated in FIG. 4.

As shown in FIGS. 2 and 3, each of the indicators 12 includes an indicating section 14 that indicates various data such as engine speed, oil pressure and cooling water temperature.

As shown in FIG. 2, the indicating section 14 generally comprises an engine speed indicating section 18 for indicating engine speed, and an engine condition indicating section 20 for indicating engine oil pressure, for example, of the respective outboard motor 13.

The engine condition indicating section 20 is adapted to display an oil pressure mark 21, and includes an oil pressure indicating section 23 for indicating a condition data value of the engine oil pressure at a predetermined position in its indication area.

The indication area of the oil pressure indicating section 23 includes a warning upper limit position 25 and a warning lower limit position 26. The ranges above the warning upper limit position 25 and below the warning lower limit position 26 are set as warning ranges. A safe range upper limit position 27 and a safe range lower limit position 28 are located between the warning upper limit position 25 and the warning lower limit position 26. The range between the safe range upper limit position 27 and the safe range lower limit position 28 is set as a safe range.

In the block diagram illustrated in FIG. 4, the engine 22 preserves indication information in a storage section of the engine 22. The indication information is preset with condition values (e.g., engine oil pressure values in the embodiment illustrated in FIG. 4) corresponding to the warning upper limit position 25, the warning lower limit position 26, the safe range upper limit position 27, and the safe range lower limit position 28, of the indication area. Values for the indication information of each engine 22 are set as indication objects. For example, a warning upper limit value is a condition value corresponding to the warning upper limit position 25. For one exemplary engine model (e.g., type), the warning upper limit value is set to an oil pressure of 1000 kPa. A warning lower limit value is a condition value corresponding to the warning lower limit position 26. For the exemplary engine model, the warning lower limit value is set to an oil pressure of 300 kPa. A safe range upper limit value is a condition value corresponding to the safe range upper limit position 27. For the exemplary engine model, the warning lower limit value is set to an oil pressure of 600 kPa. A safe range lower limit value is a condition value corresponding to the safe range lower limit position 28. For the exemplary engine model, the safe range lower limit value is set to an oil pressure of 400 kPa. An engine 22 of another model stores indication information set with respective condition values (e.g., engine oil pressure values), which are different from the foregoing values for the warning upper limit position 25, the warning lower limit position 26, the safe range upper limit position 27, and the safe range lower limit position 28.

As illustrated in FIG. 4, the indication information (stored as indication objects) of each engine 22 is transmitted to the respective indicator 12 via the LAN. In the indicator 12, the condition data value transmitted from the engine 22 as an indication object is processed based on the indication information, and the result of the processing is indicated at a predetermined position in the indication area of the indicating section 14 (FIG. 2).

The operation of the engine condition indicating device and the indicator 12 is described with respect to FIG. 4. When the engine 22 of the outboard motor 13 is in driving condition, oil pressure data is transmitted from the engine 22 of the outboard motor 13 to a transmitter/receiver module 29 in the indicator 12 via the LAN. The oil pressure data is inputted into an averaging processing section 30 of a central processing unit (CPU) 17 from the transmitter/receiver module 29. The averaging processing section 30 generates an averaged condition data value of the oil pressure data value. The averaged condition data value is inputted into an indication processing section 31.

Indication information of the engine 22 of the outboard motor 13 is also inputted as an indication object into the indication processing section 31 through the transmitter/receiver module 29.

The indication processing section 31 processes the oil pressure data value based on the indication information and generates indication data. The indication data from the indication processing section 31 is transmitted to an indication operator (indication driver) 32, which transmits control signals to the indicating section 14 for indication thereon.

In this exemplary embodiment, a warning upper limit position 25 and a warning lower limit position 26 are set in the indication area of the indicating section 14. A safe range upper limit position 27 and a safe range lower limit position 28 are set between the warning upper limit position 25 and the warning lower limit position 26.

In the illustrated embodiment, the indication processing section 31 compares the oil pressure data value with the warning upper limit value, the warning lower limit value, the safe range upper limit value, and the safe range lower limit value of the indication information, as described above, determines which position in the warning range or safe range the oil pressure data value falls on, and displays a data indication A (FIG. 2) at a predetermined position in the engine condition indicating section 20 of the indicating section 14.

Specifically, when oil pressure data of 500 kPa, for example, is inputted into the indication processing section 31, the data indication A corresponding to the oil pressure data (500 kPa) is displayed within the safe range, as shown in FIGS. 2 and 3, because the inputted value is between the safe range upper limit value (600 kPa) and the safe range lower limit value (400 kPa) for the exemplary engine model. The indication A enables an operator of the boat to instantly and accurately recognize what range the oil pressure data value is in.

With this configuration, even when the engine 22 is replaced with a counterpart of a different model with respect to the indicator 12, the indication range and other values are automatically set by utilizing indication information of the engine 22 as an indication object. The automatic setting of the values for the indicator 12 provides appropriate indications for engines 22 with different characteristics.

In the embodiment illustrated in FIGS. 1-4, indication information for each engine 22 is stored in the respective engine 22 and is transmitted to the respective indicator 12. In the embodiment illustrated in FIG. 5, a plurality of sets of indication information corresponding to engines 22 of a plurality of different models are stored in a storage section (ROM) 33 of each indicator 12.

Engine model information is inputted into the indication processing section 31 from the engine 22 as an indication object associated with the indicator 12 through the transmitter/receiver module 29. Based on the engine model information, the indication processing section 31 reads a predetermined set of indication information from the plurality of sets of indication information stored in the ROM 33.

Figure 5:
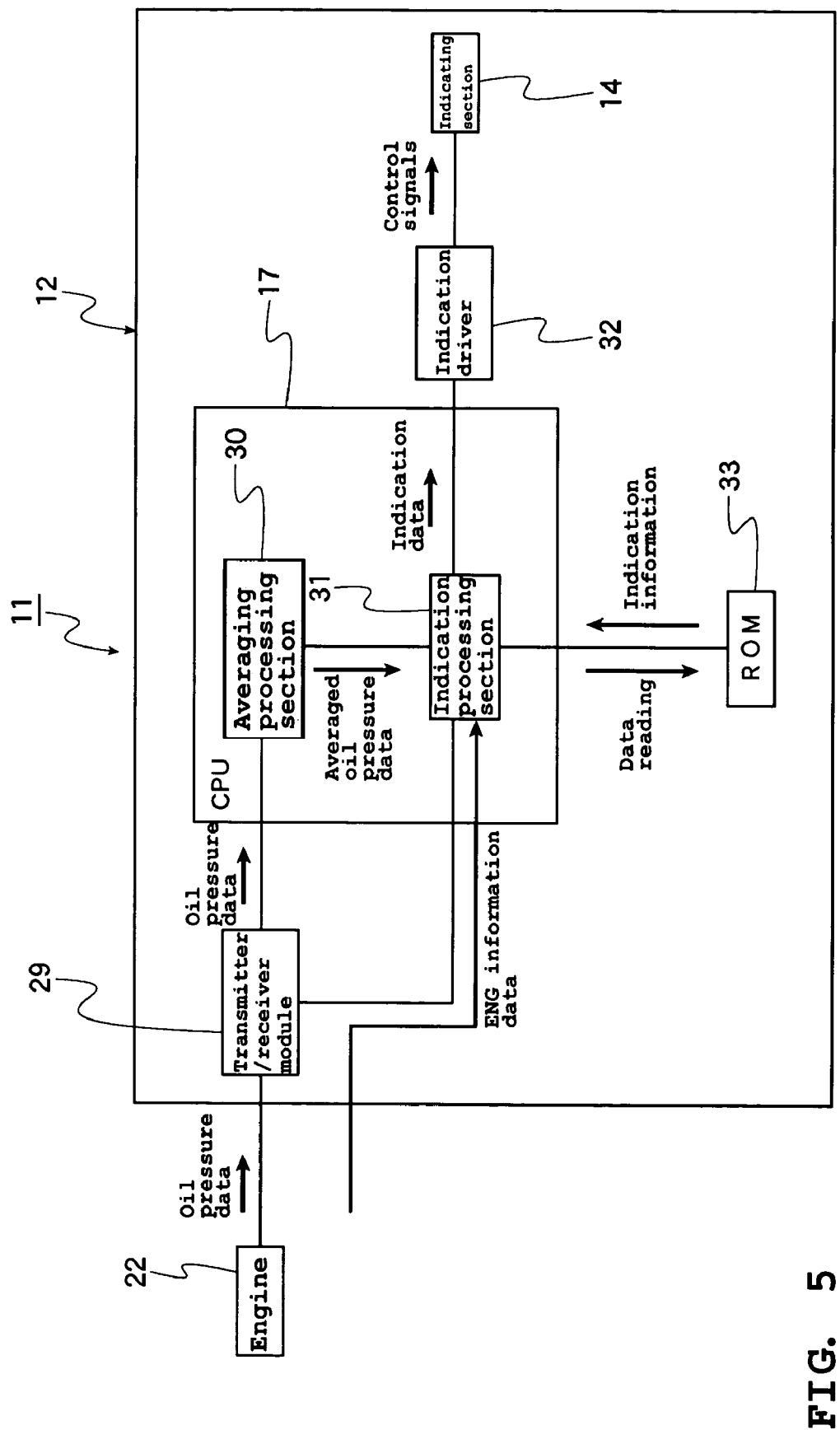
FIG. 5 illustrates a block diagram of another preferred embodiment of an engine condition indicating device for a boat.

The indication processing section 31 processes the oil pressure data value based on the indication information of the engine 22 as an indication object associated with the indicator 12 and generates indication data. The indication data is transmitted to the indication operator (indication driver) 32, which transmits control signals to the indicating section 14 for indication thereon. Other than the foregoing differences, the configuration and operation of the embodiment of FIG. 5 is similar to the embodiment of FIGS. 1-4. Thus, the detailed descriptions of the configuration and operation are not repeated.

In the description of the foregoing embodiments, engine oil pressure is indicated. The cooling water temperature, the engine rotational speed, and other operating parameters of the engines 22 in the outboard motors 13 are advantageously indicated in a similar manner.

In the above-described embodiments, a warning upper limit position 25 and a warning lower limit position 26 are set in the indication area of the indicating section 14, and a safe range upper limit position 27, and a safe range lower limit position 28 are set between the warning upper limit position 25 and the warning lower limit position 26. However, other embodiments are not limited to the illustrated positions. For example, since condition data values of different types may require different warning ranges and/or safe ranges, either the warning upper limit position or the warning lower limit position and/or either the safe range upper limit position or the safe range lower limit position may be set in a different manner.

Although the illustrated embodiments include four indicators 12 and four outboard motors 13, other embodiments in accordance with aspects of the present invention may include less than four motors and four indicators (e.g., only a single indicator and a single motor) or may include more than four of each.

Aspects of the present invention may be embodied in other specific forms without departing from the essential characteristics as described herein. The embodiments described above are to be considered in all respects as illustrative only and not restrictive in any manner. The scope of the invention is indicated by the following claims rather than by the foregoing description. Any and all changes which come within the meaning and range of equivalency of the claims are to be considered within their scope.

What is claimed is:

1. An engine condition indicating device for indicating a condition data value of a detected operating parameter of an engine of a boat, the engine condition indicating device comprising:
    an indication section, the indication section comprising:
        an indication area defining a fixed range;
        a first indication object located in the indication area in a first position responsive to the condition data value; and
        at least one second indication object located in the indication area in at least one second predetermined position within the fixed range, the at least one second indication object responsive to a condition value of the engine included in preset indication information for the engine; and
    a processing section responsive to the preset indication information for the engine to process the condition data value from the engine to determine the first position of the first indication object with respect to the at least one second predetermined position of the at least one second indication object, a plurality of sets of the indication information corresponding to a respective plurality of engine models being stored at the engine condition indicating device and being accessible by the processing section, the engine condition indicating device configured to receive engine model information from the engine, and the processing section configured to respond to the engine model information and access a selected one of the plurality of sets of indication information to obtain the preset indication information for the engine, the processing section configured to adjust an indication range of condition data values for different engines to the fixed range of the indication area to accurately indicate the position of the first indication object relative to the at least one second indication object for any of the different engines.

2. The engine condition indicating device for a boat according to claim 1, wherein the at least one second position comprises:
    a warning upper limit position;
    a warning lower limit position;
    a safe range upper limit position; and
    a safe range lower limit position.

3. The engine condition indicating device for a boat according to claim 2, wherein the condition data value represents at least one of engine oil pressure, engine cooling water temperature, or engine speed.

4. The engine condition indicating device for a boat according to claim 3, wherein the indication information is stored at the engine.

5. The engine condition indicating device for a boat according to claim 3, wherein:
    a plurality of sets of the indication information corresponding to a respective plurality of engine models are stored at the engine condition indicating device and are accessible by the processing section;
    the engine condition indicating device receives engine model information from the engine; and
    the processing section responds to the engine model information and accesses a selected one of the plurality of sets of indication information to obtain the preset indication information for the engine.

6. The engine condition indicating device for a boat according to claim 2, wherein the indication information is stored at the engine.

7. The engine condition indicating device for a boat according to claim 2, wherein:
- a plurality of sets of the indication information corresponding to a respective plurality of engine models are stored at the engine condition indicating device and are accessible by the processing section;
- the engine condition indicating device receives engine model information from the engine; and
- the processing section responds to the engine model information and accesses a selected one of the plurality of sets of indication information to obtain the preset indication information for the engine.

8. The engine condition indicating device for a boat according to claim 1, wherein the condition data value represents at least one of engine oil pressure, engine cooling water temperature, or engine speed.

9. The engine condition indicating device for a boat according to claim 8, wherein the indication information is stored at the engine.

10. The engine condition indicating device for a boat according to claim 8, wherein:
- a plurality of sets of the indication information corresponding to a respective plurality of engine models are stored at the engine condition indicating device and are accessible by the processing section;
- the engine condition indicating device receives engine model information from the engine; and
- the processing section responds to the engine model information and accesses a selected one of the plurality of sets of indication information to obtain the preset indication information for the engine.

11. The engine condition indicating device for a boat according to claim 1, wherein the indication information is stored at the engine.

12. An engine condition indicating device for indicating a condition data value of a detected operating parameter of an engine of a boat, the engine condition indicating device comprising:
- an indication section, the indication section comprising:
  - an indication area;
  - a first indication object located in the indication area in a first position responsive to the condition data value; and
  - at least one second indication object located in the indication area in at least one second position, the at least one second indication object responsive to a condition value of the engine included in preset indication information for the engine, the at least one second position comprising a warning upper limit position, a warning lower limit position, a safe range upper limit position and a safe range lower limit position; and
- a processing section responsive to the preset indication information for the engine to process the condition data value from the engine to determine the first position of the first indication object with respect to the at least one second position of the at least one second indication object, the condition data value representing at least one of engine oil pressure, engine cooling water temperature or engine speed, a plurality of sets of the indication information corresponding to a respective plurality of engine models being stored at the engine condition indicating device and being accessible by the processing section, the engine condition indicating device configured to receive engine model information from the engine and the processing section configured to respond to the engine model information and access a selected one of the plurality of sets of indication information to obtain the preset indication information for the engine.

13. An engine condition indicating device for indicating a condition data value of a detected operating parameter of an engine of a boat, the engine condition indicating device comprising:
- an indication section, the indication section comprising:
  - an indication area;
  - a first indication object located in the indication area in a first position responsive to the condition data value; and
  - at least one second indication object located in the indication area in at least one second position, the at least one second indication object responsive to a condition value of the engine included in preset indication information for the engine, the at least one second position comprising a warning upper limit position, a warning lower limit position, a safe range upper limit position and a safe range lower limit position; and
- a processing section responsive to the preset indication information for the engine to process the condition data value from the engine to determine the first position of the first indication object with respect to the at least one second position of the at least one second indication object, a plurality of sets of the indication information corresponding to a respective plurality of engine models being stored at the engine condition indicating device and being accessible by the processing section, the engine condition indicating device configured to receive engine model information from the engine, and the processing section configured to respond to the engine model information and access a selected one of the plurality of sets of indication information to obtain the preset indication information for the engine.

14. An engine condition indicating device for indicating a condition data value of a detected operating parameter of an engine of a boat, the engine condition indicating device comprising:
- an indication section, the indication section comprising:
  - an indication area;
  - a first indication object located in the indication area in a first position responsive to the condition data value; and
  - at least one second indication object located in the indication area in at least one second position, the at least one second indication object responsive to a condition value of the engine included in preset indication information for the engine; and
- a processing section responsive to the preset indication information for the engine to process the condition data value from the engine to determine the first position of the first indication object with respect to the at least one second position of the at least one second indication object, the condition data value representing at least one of engine oil pressure, engine cooling water temperature or engine speed, a plurality of sets of the indication information corresponding to a respective plurality of engine models being stored at the engine condition indicating device and being accessible by the processing section, the engine condition indicating device configured to receive engine model information from the engine, and the processing section configured to respond to the engine model information and access a selected one of the plurality of sets of indication information to obtain the preset indication information for the engine.

15. An engine condition indicating device for indicating a condition data value of a detected operating parameter of an engine of a boat, the engine condition indicating device comprising:
   an indication section, the indication section comprising:
      an indication area;
      a first indication object located in the indication area in a first position responsive to the condition data value; and
      at least one second indication object located in the indication area in at least one second position, the at least one second indication object responsive to a condition value of the engine included in preset indication information for the engine; and
   a processing section responsive to the preset indication information for the engine to process the condition data value from the engine to determine the first position of the first indication object with respect to the at least one second position of the at least one second indication object, a plurality of sets of the indication information corresponding to a respective plurality of engine models being stored at the engine condition indicating device and being accessible by the processing section, the engine condition indicating device configured to receive engine model information from the engine, and the processing section configured to respond to the engine model information and access a selected one of the plurality of sets of indication information to obtain the preset indication information for the engine.

16. An engine condition indicating device for indicating a condition data value of a detected operating parameter of an engine of a boat, the engine condition indicating device comprising:
   an indication section, the indication section comprising:
      an indication area defining a range;
      a first indication object located in the indication area in a first position responsive to the condition data value; and
      at least one second indication object located in the indication area in at least one second position, the at least one second indication object responsive to a condition value of the engine included in preset indication information for the engine, the at least one second position comprising a warning upper limit position, a warning lower limit position, a safe range upper limit position and a safe range lower limit position; and
   a processing section responsive to the preset indication information for the engine to process the condition data value from the engine to determine the first position of the first indication object with respect to the at least one second position of the at least one second indication object, the processing section configured to adjust an indication range of condition data values for different engines to the range of the indication area to accurately indicate the position of the first indication object relative to the at least one second indication object for any of the different engines.

* * * * *

UNITED STATES PATENT AND TRADEMARK OFFICE
CERTIFICATE OF CORRECTION

| | | |
|---|---|---|
| PATENT NO. | : 7,330,133 B2 | Page 1 of 1 |
| APPLICATION NO. | : 10/967949 | |
| DATED | : February 12, 2008 | |
| INVENTOR(S) | : Masaru Kawanishi and Takashi Okuyama | |

It is certified that error appears in the above-identified patent and that said Letters Patent is hereby corrected as shown below:

At Drawing Sheet 4 of 5, line 1 (below referral box 22), please delete "I. <u>FIG.4</u>" and insert therefore, -- FIG. 4 --.

Signed and Sealed this

Twenty-ninth Day of July, 2008

JON W. DUDAS
*Director of the United States Patent and Trademark Office*